US012682914B2

(12) United States Patent
Keskinen

(10) Patent No.: US 12,682,914 B2
(45) Date of Patent: Jul. 14, 2026

(54) PROCESSING RESONANCES IN A DIGITAL SOUND SIGNAL USING SUB-BAND SUB-SAMPLING

(71) Applicant: oeksound oy, Helsinki (FI)

(72) Inventor: Olli Keskinen, Helsinki (FI)

(73) Assignee: Oeksound Oy, Helsinki (FI)

( * ) Notice: Subject to any disclaimer, the term of this patent is extended or adjusted under 35 U.S.C. 154(b) by 79 days.

(21) Appl. No.: 18/525,904

(22) Filed: Dec. 1, 2023

(65) Prior Publication Data

US 2024/0194218 A1 Jun. 13, 2024

(51) Int. Cl.
*G10L 25/18* (2013.01)
*G10L 19/02* (2013.01)
*G10L 21/0232* (2013.01)

(52) U.S. Cl.
CPC .......... *G10L 25/18* (2013.01); *G10L 19/0204* (2013.01); *G10L 21/0232* (2013.01)

(58) Field of Classification Search
CPC .. G10L 25/18; G10L 19/0204; G10L 21/0232
See application file for complete search history.

(56) References Cited

U.S. PATENT DOCUMENTS

2007/0078645 A1* 4/2007 Niemisto ............ G10L 21/0208 704/E21.004
2009/0046864 A1* 2/2009 Mahabub .................. H04S 7/30 381/17
2009/0110218 A1* 4/2009 Swain .................... H03G 5/165 381/300
2009/0208027 A1* 8/2009 Fukuda .................... H04R 3/02 381/71.6
2010/0142727 A1* 6/2010 Otani ..................... H03G 9/005 381/98
2010/0166218 A1* 7/2010 Saito ...................... H03G 5/165 381/98
2016/0210976 A1* 7/2016 Lopez ..................... G10L 21/02

(Continued)

FOREIGN PATENT DOCUMENTS

JP S61121625 A 6/1966

OTHER PUBLICATIONS

Machine Language Translation of JP61121625A.

*Primary Examiner* — Shaun Roberts
(74) *Attorney, Agent, or Firm* — BelayIP

(57) ABSTRACT

This disclosure relates to signal processing of music and in particular the removal of unwanted artifacts from a music signal. A method for attenuating resonances in a sound signal which uses sub-sampling of at least one sub-band of the original signal to save computing resources is set out. The method includes at least steps in which an incoming signal block is filtered into at least two different frequency sub-band signals, at least one of the sub-band signals is subsampled, a resonance analysis step is performed for each sub-band signal, a step resulting in a filter response, a sub-band signal from each sub-band is convolved with the corresponding filter response to produce a filtered sub-band signal, for each subsampled sub-band, the filtered sub-band signal is upsampled, and finally the upsampled sub-band signals of subsampled sub-bands and filtered sub-band signals of any non-subsampled sub-bands are combined to form a result signal block.

11 Claims, 3 Drawing Sheets

(56) References Cited

U.S. PATENT DOCUMENTS

| | | | | |
|---|---|---|---|---|
| 2017/0111737 | A1* | 4/2017 | Painter | H04R 3/04 |
| 2017/0146394 | A1* | 5/2017 | Hayashi | G01H 13/00 |
| 2018/0115824 | A1* | 4/2018 | Cassidy | H04R 3/007 |
| 2021/0012785 | A1* | 1/2021 | Husain | G10L 19/0204 |
| 2022/0230618 | A1* | 7/2022 | Sakamoto | G10K 11/17879 |

* cited by examiner

PROCESSING RESONANCES IN A DIGITAL SOUND SIGNAL USING SUB-BAND SUB-SAMPLING

CROSS REFERENCE TO RELATED APPLICATIONS

This application claims priority to Finnish patent application FI20227155, filed Dec. 2, 2022, the contents of which is herein incorporated by reference.

BACKGROUND OF THE INVENTION

Field of the Invention

This invention is related to signal processing of music. The invention specifically concerns removal of unwanted artifacts from a music signal.

Description of Related Art

Music signals often include unwanted artifacts, especially during recording sessions or live sessions. The room along with the equipment and its positioning may cause various resonances, and unwanted strengthening of some frequencies and a skew in the tonal balance. For recorded music, these can be removed in post processing after the recording session either manually or using automated tools. This correction work is typically difficult and highly intensive if done manually. In live sound reinforcement and broadcasting situations there is the additional requirement of short response time.

The need for digital sound processing has increased markedly in the last decades. Sound processing is an essential part of today's sound aesthetics, and sound processing has become an inseparable part of how sound is expected to be heard. A live music production is nowadays expected to approach the same as sonic quality as the recorded sound, and to achieve this the sound must be tightly controlled both in dynamics and tone. On the other hand, the live sound and broadcast engineers expect to use similar tools as those used in the recording industry and studio work.

Sound amplification in live events has certain demanding requirements. The sound system must have low latency, with the total latency being preferably below 10 ms. This is the preferable maximum delay over the whole audio chain, including wireless microphones, analog to digital converters, signal processing devices, digital to analog converters, any processing within the sound reproduction systems, and any other devices handling the audio signals.

Large productions have strong scheduling pressures, and personnel responsible for sound quality typically have only a very limited time available for correcting the sound quality. In addition, problems often arise during the actual live event as conditions change in the acoustics of the performing space, or if any sound technology or audio reproduction devices are changed, whereby all problems cannot be corrected in preproduction before the show.

Microphones often cause difficulties as the chosen sizes, placements and directional patterns of the microphones may affect the sound quality negatively. Microphones often need to be placed closer to the sound source due to mic bleed and practicality than would be optimal considering the quality of sound. Close to an instrument or the mouth of a singer unnatural resonances and tonal imbalances are enhanced due to unnevenness in the directional pattern of the sound source and in turn by the directional pattern of the microphone. These unevennesses typically vary with the played or sung note, as they are a direct result from the acoustical properties of the sound sources. In order to obtain a good quality show even when microphone arrangements are suboptimal, resulting resonances need to be attenuated dynamically in the sound signal.

Many artifacts start quickly and suddenly, whereby it is important for the quality of the end result that the attenuation process can react fast to new resonances. Conditions in the acoustical environment often change e.g. due to movement of musicians and other disturbances may happen in live situations, easily causing different artifacts that can arise quickly. Consequently, any processes attenuating and removing artifacts need to act with equal speed.

Digital mixer systems employ high sampling frequencies with the typical sampling rate starting from 44.1 kHz and ranging all the way up to 192 kHz, with higher rates being increasingly popular. High sampling frequencies are often desired, since they allow nonlinear processing of the sound without oversampling required at lower sampling frequencies, which simplifies the sound processing architecture. Using higher sampling rates places more demand on the underlying digital signal processors, however, which in turn increase the cost.

Further, the fundamental frequencies of typical instruments are in the range of 80 Hz to 260 Hz, and those of bass instruments even lower. Processing of low-frequency artifacts require use of larger FFT sizes than are needed for mid- and high-frequency ranges. Larger FFT sizes are more resource consuming to calculate, and in general, all analysis operations require more computing power when analysis is performed with larger vector sizes.

Uneven directional patterns at the fundamental frequency and a few of the first harmonics are especially problematic, as low frequencies present a high computational load. Analysis and reliable processing of a low frequency signal with fast fourier transforms (FFT) requires high resolution: at sampling frequency of 44.1 kHz reliable processing of a 80 Hz signal could be argued to require the use of a large FFT with at least 2048 bins for convolution operations. Calculation of FFTs is a resource intensive operation, and calculation of large FFTs even more so. Further, the need for low latency and the rapidly changing corrective needs require calculation of such a large FFT even 6000 times per second merely for implementing a single convolution step with dynamically adapting filter response. These factors combine to require a high processing power.

A modern live production typically requires many sound channels, whereby the cost per channel is an essential question for budgeting the show. However, powerful DSP (digital signal processing) processors are expensive, whereby the simple solution of increasing the computing power of the DSP equipment is not feasible in many situations. The total cost of the sound system needs to be kept at reasonable levels, whereby reducing the need for high signal processing power is important. New processing methods that reduce the computing power requirements are needed.

BRIEF SUMMARY OF THE INVENTION

The presently described invention solves the problems of prior art by providing a method for attenuating resonances in a sound signal, which method uses sub-sampling of at least one sub-band of the original signal to save computing resources. As a coarse overview description, the method comprises at least steps in which an incoming signal block is filtered into at least two different frequency sub-band signals, at least one of the sub-band signals is subsampled, a resonance analysis step is performed for each sub-band signal, said step resulting in a filter response, a sub-band block from each sub-band is convoluted with the corresponding filter response to produce a filtered sub-band block, for each subsampled sub-band, the filtered sub-band block is upsampled, the upsampled sub-band blocks of subsampled sub-bands and filtered sub-band blocks of any non-subsampled sub-bands are combined to form a result signal block.

This method saves computing resources by performing analysis based on subsampled sub-band blocks.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE SEVERAL VIEWS OF THE DRAWINGS

Further advantages, features, and details of the various embodiments of this disclosure will become apparent from the ensuing description of a preferred exemplary embodiment and with the aid of the drawings. The features and combinations of features recited below in the description, as well as the features and feature combination shown after that in the drawing description or in the drawings alone, may be used not only in the particular combination recited, but also in other combinations on their own, without departing from the scope of the disclosure.

An advantageous embodiment of the present invention is set out below with reference to the accompanying figures, wherein.

DETAILED DESCRIPTION OF THE INVENTION

The following embodiments are exemplary. Although the specification may refer to "an" "one", or "some" embodiment(s), this does not necessarily mean that each such reference is to the same embodiment(s), or that the feature only applies to a single embodiment. Features of different embodiments may be combined to provide further embodiments.

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of "A, B, and C" should not be understood as including only one of A, only one of B, only one of C, or any combination of A, B, and C.

In the following, features of the invention will be described with a simple example of a sound processing method with which various embodiments of the invention may be implemented. Only elements relevant for illustrating the embodiments are described in detail. Details that are generally known to a person skilled in the art may not be specifically described herein.

Figure 1:
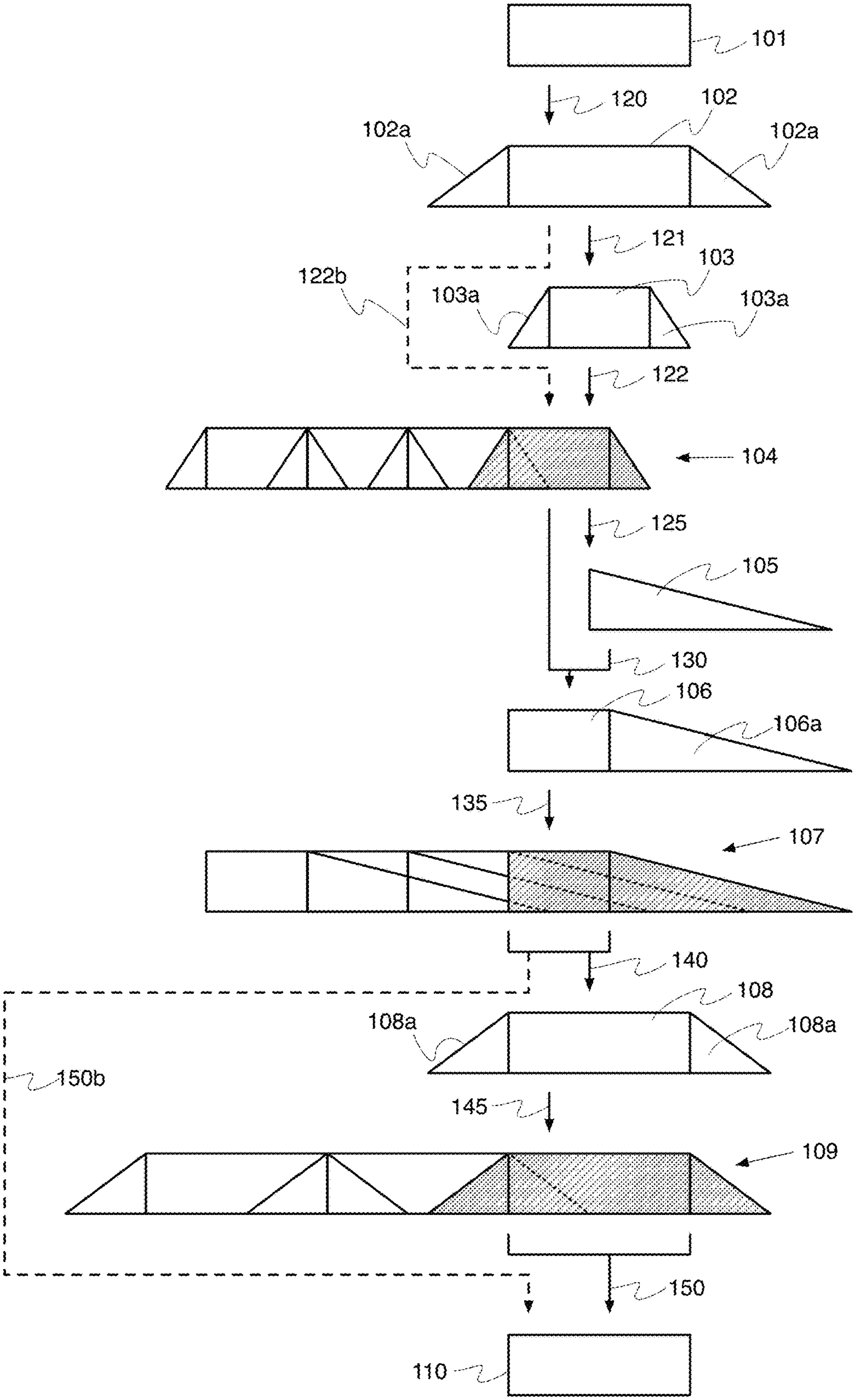
FIG. 1 describes how incoming signal blocks are processed.

FIG. 1 illustrates processing of signals according to an embodiment of the invention. FIG. 1 shows how signal blocks are processed, transformed, added into various buffers, and extracted from various buffers for the next processing steps. FIG. 1 illustrates processing of a single incoming signal block, and particularly processing of such a sub-band of the incoming signal, which sub-band is processed in subsampled form.

FIG. 1 shows an incoming signal block 101. In FIG. 1, the width of the block represents the number of samples in the block, while the height of the block represents maximum amplitude of the signal sample. The number of samples in an incoming signal block is dependent of the implementation, and is in typical digital signal processing systems 8 samples or more. The invention is not limited to any specific block size or block size range. The number of bits in a sample depends on the implementation. At the time of writing of this specification, typical sample sizes used in digital signal processing are 8, 16, 24, or 32 bits. The invention can be used with any of these sample sizes. The invention is not limited to any specific size or way of representation of a signal sample.

First, the incoming signal block 101 is divided 120 into at least two sub-band signal blocks 102 corresponding to different frequency bands. For clarity, FIG. 1 shows only one of the sub-band blocks 102. The division can be performed for example by filtering, i.e. by using low pass, high pass, and/or bandpass filtering or various combinations of them as is well known by a man skilled in the art. Such filtering operations can also be performed in the frequency domain using fourier transform, for example by taking a fourier transform of the signal, multiplying the resulting spectrum by a desired filter spectrum, and taking the inverse fourier transform of that result. Depending on the type of filter used, filtering may cause smearing on one or both sides of the resulting filtered block, as is well known by a man skilled in the art. This smearing effect is illustrated by the features 102*a* in FIG. 1, which represent signal content that is smeared by the filtering producing a number of samples with some signal content on either side of the block 102.

Next, at least one of the sub-band signals 102—including the smeared out features 102*a*—are subsampled 121 to form a subsampled sub-band signal 103, 103*a*. The subsampling factor can in different embodiments of the invention be 2, 4, 8 or more. The subsampling factor can also be different for different sub-bands. In subsampling with factor n, every n:th sample is retained, while the rest of samples are discarded.

Next, the subsampled signal 103, 103*a* is added 122 to a buffer 104. The addition performed in such a way that that the block 103 is to be the first block in the buffer 104, while any smearing features of a previously added block are summed with corresponding samples in block 103, and the samples comprising the smearing features 103*a* of block 103 are summed with corresponding samples in the buffer, in order to retain signal information comprised in the smearing features.

Next, a resonance analysis step is performed 125 based on at least the newest block in the buffer 104. In a further embodiment, resonance analysis is based on two or more of the most recent blocks in the buffer 104. Using more than one of the most recent blocks has the advantage that the resonance analysis step then has more past signal context available.

The resonance analysis step, which is described in more detail later in this specification, results in a filter response 105. The filter response is convolved 130 with the newest block in the buffer 104, resulting in a convolved block 106 with a smear feature 106*a* resulting from the convolution operation.

The convolved block 106, 106*a* is then added 135 to a second buffer 107. The addition is performed in a similar way as described previously with reference to step 120: the block 106 is placed to be the first block in the buffer, summing samples of the block with any signal content from any earlier smear features in the same sample positions.

Next, the first complete block in the buffer 107 is upsampled 140 to form an upsampled block 108.

FIG. 1 illustrates smearing features 108*a* on either side of the upsampled block 108. In this example of an embodiment, the upsampling is performed by inserting at least one sample with zero signal after or before each sample of the block to be upsampled, and low pass filtering the result. Depending on the filtering process, smearing features 108*a* may be created on one or both sides of the upsampled block 108.

The number of samples with zero signal inserted between samples of the block to be upsampled depends on the upsampling factor used in the particular implementation of an embodiment of the invention. If the upsampling factor is 2, one zero signal sample is inserted after or before each sample. If the upsampling factor is 4, three zero signal samples are inserted after or before each sample. If the upsampling factor is n, n−1 zero signal samples are inserted after or before each sample to make the size of the resulting upsampled block be n times the size of the block to be upsampled. In this embodiment, the upsampling factor is the same as the subsampling factor used in the subsampling step 115, resulting in the same block size as of the incoming signal block 101. A man skilled in the art knows many different ways to perform upsampling, whereby these are not described in further detail in this specification. The invention is not limited to use of any single specific method for performing upsampling.

Next, the upsampled block 108, 108*a* is added 145 to a third buffer 109. The addition is done in same way as previously described at steps 122 and 135: the block 108 is placed to be the first block in the buffer, summing samples of the block with any signal content from any earlier smear features in the same sample positions.

Next, the newest block in the buffer 109 is summed 150 with corresponding blocks of the other sub-bands to form the processed block 110.

The buffers 104, 107, 109 can be for example ring buffers or of an another type of endless buffer.

In an embodiment of the invention, a frequency sub-band is processed without subsampling. Processing of a sub-band block without subsampling has certain differences to the processing described previously with reference to FIG. 1. These differences are indicated with dashed arrows in FIG. 1. In this embodiment, the incoming signal block 101 is divided into more than one sub-band blocks 102 by filtering. The description in this paragraph describes the processing of one of these sub-band blocks 102. The sub-band block 102 with any smear features 102*a* is added 122*b* to a buffer 104. The addition is done in same way as previously described at steps 122, 135, and 145: the block 102 is placed to be the first block in the buffer, summing samples of the block with any signal content from any earlier smear features in the same sample positions. Next, a resonance analysis step is performed 125 on at least part of the content of the buffer 104, resulting in a filter response 105. The filter response is convolved 130 with the newest block in the buffer 104, resulting in a convolved block 106 with a smear feature 106*a* resulting from the convolution operation. The convolved block 106, 106*a* is then added 135 to a second buffer 107. The addition is performed in a similar way as described previously: the block 106 is placed to be the first block in the buffer, summing samples of the block with any signal content from any earlier smear features in the same sample positions. Next, the newest block in the buffer 107 is summed 150*b* with corresponding blocks of the other sub-bands to form the processed block 110.

As can be seen in FIG. 1, since a non-subsampled frequency band does not need the upsampling step 140, also the third buffer 109 is not needed for a non-subsampled frequency band, and the final sub-band block that is to be summed with those of other sub-bands can be obtained from the second buffer 107 which is the result buffer for such a non-subsampled frequency band.

In a further embodiment of the invention, the step of convolving 130 a block with the filter response 105 is performed with the subsampled block 103,103*a* in the case of a subsampled sub-band, or with the filtered sub-band block 102,102*a* in the case of a non-subsampled sub-band, instead of the newest block in the buffer 104. Such an embodiment is typically slightly more computationally intensive, but still a possible way to implement the invention.

In an embodiment of the invention, the sub-band with highest frequency is processed without subsampling.

As FIG. 1 describes processing of a single incoming signal block, the processing is repeated for each incoming signal block in order to form a continuous output signal. The processing of FIG. 1 also describes processing of only one signal channel.

In a further embodiment of the invention, in processing of signals such as a stereo signal with highly correlated channels, some parts of the processing may be combined for more than one channel. For example, in an embodiment of the invention the filtered sub-bands of the two channels of a stereo signal are added together before the resonance analysis step whereby the computationally intensive resonance analysis step is performed only once, and the resulting filter response is used separately for filtering each of the two channels of the stereo signal.

In the following, performing a resonance analysis step according to an embodiment of the invention is described in more detail with reference to FIG. 2. This resonance analysis step is performed on at least one block of sub-band signal data, and produces a filter response.

In step 210, a fast fourier transform is performed on at least one block of the sub-band signal data. The resulting complex response is transformed 220 into a real response. The real response can be for example a magnitude spectrum, a power spectrum, or another spectrum derived from one or both of these. The real response is overpass filtered 230 to remove any trends in the response and to retain only the peaks of the response.

A resonance response is calculated 240 on the basis of the filtered real response. The resonance response describes how much different frequencies of the spectrum are to be attenuated or not. This calculation can be performed for example using functions 1/(1+x) or −log(x). However, the invention is not limited to the use of only these particular functions. A man skilled in the art can form many other functions for calculation of a resonance response based on a spectrum of signal peaks which are to be attenuated.

Next, a filter response is formed 250 on the basis of the calculated resonance response. This can be performed for example using a Hilbert transform to obtain a minimum phase response. Various ways to determine a filter response that produces an attenuation or other change of the signal described by a resonance response is well known by a man skilled in the art, whereby these are not described in any further detail in this specification.

The resulting filter response is the filter response that is used in filtering in step 130 of FIG. 1.

Figure 2:
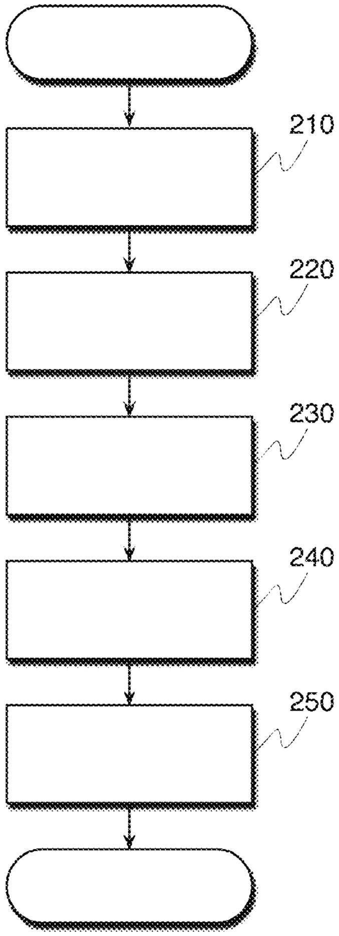
FIG. 2 describes the resonance analysis step in more detail.

Different embodiments of the invention provide some variations to the basic method described in FIG. 2. In an embodiment of the invention, the resonance analysis step comprises a step of windowing the sub-band signal data before the step of performing 210 a fast fourier transform in order to reduce spectral artifacts. Windowing, as a man skilled in the art knows, refers to multiplying the data by a predefined window function. In a further embodiment of the invention, the windowing function is weighted towards recent samples. However, the invention is not limited to any specific windowing function, and any windowing function known to a man skilled in the art may be used in different embodiments of the invention.

In various embodiments of the invention different processing steps are taken between the steps of highpass filtering 230 and calculation of a resonance response. As the filtered spectrum resulting from step 230 describes the peaks of the spectrum of the particular sub-band signal, and in step 240 a resonance response is calculated based on the spectrum to specify how to attenuate or otherwise change the signal at those peaks, any further processing of the spectrum between these two steps provides a versatile way to fine-tune the results of the resonance analysis process and the treatment of the audio signal. Various steps to process the spectrum between the steps 230 and 240 are described in the following. In various embodiments of the invention, any one of the following steps A to E may be taken, or more than one, in any order; or none of them.

Step A: Clipping the signal by removing spectrum content that is below a predetermined threshold, leaving only those peaks of the spectrum that are higher than the threshold. By controlling the threshold, one can adjust how high the spectral peaks need to be, before they affect signal processing in the resonance analysis phase.

Step B: Combining spectral information with the corresponding information of previous runs of the resonance analysis step. In an embodiment of the invention, each bin of the spectrum is averaged using a sliding average over a number of runs of the resonance analysis step. Such averaging would allow reacting to peaks that arise slowly, or slow down attenuation of peaks.

Step C: Dynamic remapping of bin values, i.e. by passing the bin value through a mathematical function in order to adjust the bin value. This can be used for example to reduce the spectrum peaks proportionally to their height so that higher peaks are reduced proportionally more than lower peaks. As a result, when the resonance response is calculated in step 240, the higher peaks are then attenuated proportionally less than lower peaks.

Step D: Rounding the peaks of the spectrum by lowpass filtering. This operation widens the peaks of the spectrum. This can reduce the amount of artefacts caused by the processing itself, as a wider spectral feature can be represented by a shorter filter and thus reduce ringing of the resulting filter in the time domain.

Step E: Weighting of certain frequencies. This operation can be used for example for simply weighting certain frequency ranges in the analysis, or for example to provide a better fit of the produced filter response of different sub-bands to each other.

The invention is not limited to the steps A to E in processing of the spectrum between the steps 230 and 240. Embodiments of the invention can process the spectrum using other signal processing steps known to a man skilled in the art.

The invention can be implemented in many different ways. The inventive method can be implemented in a dedicated signal processing device, as a part of a sound processing device such as a digital mixer unit, or for example as computer software stored on a computer readable medium.

Figure 3:
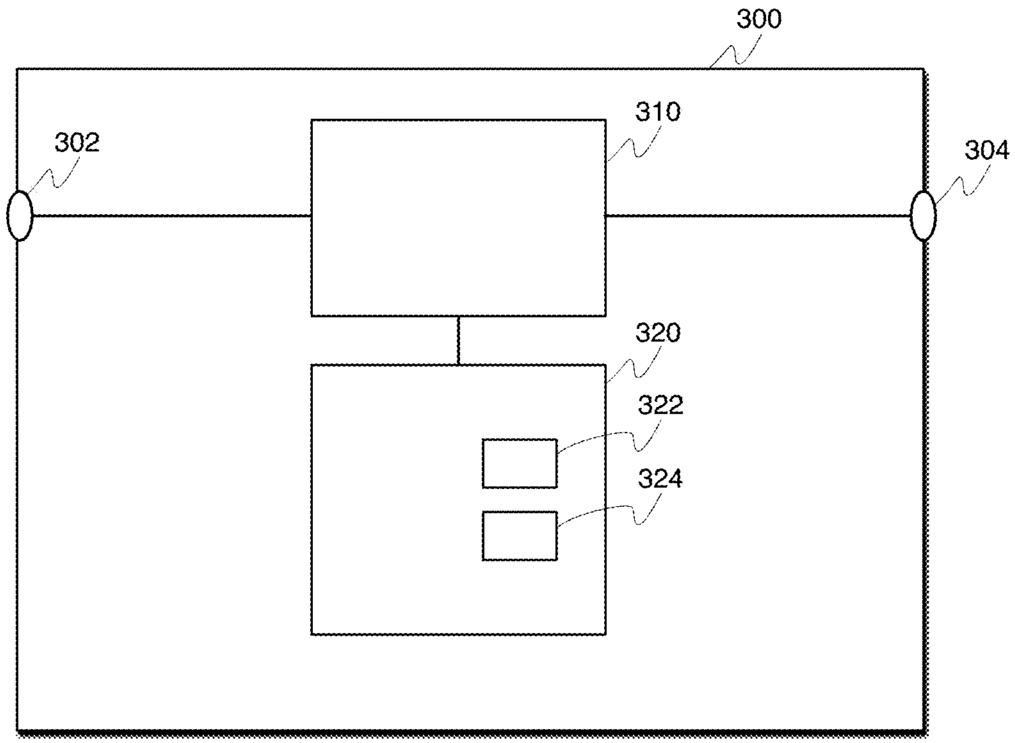
FIG. 3 illustrates a device according to an embodiment of the invention.

FIG. 3 illustrates a sound processing device 300. The device can be for example a digital mixer unit or a dedicated sound processing device.

The device 300 comprises a processor 310 functionally connected to an input 302 and an output 304. The device comprises also a memory element 320 storing instructions 322, 324 to be executed by the processor. The instructions, when executed by the processor 310, cause the processor to perform the inventive method as described in this specification and defined in the claims.

In further embodiments of the invention the device 300 can also comprise other functional elements known to a man skilled in the art such as analog-to-digital (AD) and digital-to-analog (DA) converters. The device can also comprise a plurality of processors. The processors can be dedicated signal processing processors, generic programmable microprocessors or for example processors implemented using FPGAs (field programmable gate arrays).

The invention can also be implemented as a software product, as instructions stored on a storage media such that the instructions, when executed by a processor, cause the processor to perform the inventive method described in the claims. The storage media can be a semiconductor based device such as a volatile memory device, or for example a non-volatile flash memory device. Some further examples of such machine-readable storage media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray discs, ultra density optical discs, and any other optical or magnetic media. The invention can also be implemented as a downloadable software product that can be installed in a sound processing device.

The invention has several benefits. The invention saves processing power, which reduces the cost of the signal processing chain. The invention allows more processing than prior art solutions while keeping within maximum allowable processing delays in the signal processing chain. The invention allows automatic processing and attenuation of resonances arising in the sound signal during a live event.

Saving of processing power allows processing of more signal channels with the same processor, or executing more signal processing instances on the same processor. Saving of processing power also allows for use of a cheaper processor, and savings in energy use. The inventive method also reduces the need for cache memory due to smaller vector sizes provided by the downsampling operation. The inventive method also provides lower latency, since the process can due to reduced processing power requirements be performed more often i.e. with smaller input block size. The invention also allows processing of low frequencies with smaller FFT sizes, which allows provision of better resolution at low frequencies.

In the following, a number of embodiments of the invention are set out.

According to a first aspect of the invention, a method for processing resonances in a digital sound signal is provided. According to a first embodiment of this first aspect of the invention, the method comprises at least the steps of

- receiving a first block of new sound samples
- filtering said first block into at least two sub-band signals representing different frequency bands of the audio content in said first block, and
- performing at least the following steps S1 to S7 for at least one of said at least two sub-band signals:
- S1) sub-sampling said sub-band signal,
- S2) adding the sub-sampled signal to a first buffer for the corresponding frequency band,
- S3) performing a resonance analysis step for the first buffer for the corresponding frequency band, thereby producing a filter response for the corresponding frequency band,
- S4) convolving the sub-sampled signal or the first complete block of the first buffer with the filter response for the corresponding frequency band,
- S5) adding the convolution result to a second buffer for the corresponding frequency band,
- S6) upsampling the first complete block of said second buffer for the corresponding frequency band, and
- S7) adding the upsampled result to a result buffer for the corresponding frequency band; and
- summing the first complete blocks of said result buffers for each frequency band to form an output block.

According to a second embodiment of this first aspect of the invention,

- at least the following steps are performed for at least one of said at least two sub-band signals:
- adding the sub-band signal to a first buffer for the corresponding frequency band,
- performing a resonance analysis step for the first buffer for the corresponding frequency band, thereby producing a filter response for the corresponding frequency band,
- convolving the sub-band signal or the first complete block of the first buffer with the filter response for the corresponding frequency band, and
- adding the convolution result to a result buffer for the corresponding frequency band.

According to a third embodiment of this first aspect of the invention,

- said step of performing resonance analysis on a buffer comprises at least the steps of
- performing a fast fourier transform on a plurality of latest blocks of said buffer,
- converting the resulting complex response into a real response,
- overpass filtering of said real response to retain only peaks of said real response,
- forming a resonance response based on said filtered real response, and
- forming said filter response based on the resonance response.

According to a fourth embodiment of this first aspect of the invention, the method further comprises at least the step of windowing the data in said buffer before the step of performing (210) a fast fourier transform.

According to a fifth embodiment of this first aspect of the invention, the method further comprises at least the step of clipping said filtered real response after the step of overpass filtering to remove any signal in said filtered real response that is lower than a predetermined threshold.

According to a second aspect of the invention, a sound processing device is provided. The sound processing device has one or more processors and one or more computer-readable storage media. According to a first embodiment of this second aspect of the invention, the storage media has instructions stored thereon that, when executed by the one or more processors, cause the one or more processors to perform at least the steps of

- receiving a first block of new sound samples,
- filtering said first block into at least two sub-band signals representing different frequency bands of the audio content in said first block,
- performing at least the following steps S1 to S7 for at least one of said at least two sub-band signals:
- S1) sub-sampling said sub-band signal,
- S2) adding the sub-sampled signal to a first buffer for the corresponding frequency band,
- S3) performing a resonance analysis step for the first buffer for the corresponding frequency band, thereby producing a filter response for the corresponding frequency band,
- S4) convolving the sub-sampled signal or the first complete block of the first buffer with the filter response for the corresponding frequency band,
- S5) adding the convolution result to a second buffer for the corresponding frequency band,
- S6) upsampling the first complete block of said second buffer for the corresponding frequency band, and
- S7) adding the upsampled result to a result buffer for the corresponding frequency band; and
- summing the first complete blocks of said result buffers for each frequency band to form an output block.

According to a second embodiment of this second aspect of the invention, the storage media further has instructions stored thereon that, when executed by the one or more processors, cause the one or more processors to perform at least the following steps for at least one of said at least two digital signals representing different frequency bands of the signal in said first block:

- adding the signal to a first buffer for the corresponding frequency band,
- performing a resonance analysis step for the first buffer for the corresponding frequency band, thereby producing a filter response for the corresponding frequency band,
- convolving the signal or the first complete block of the first buffer with the filter response for the corresponding frequency band, and
- adding the convolution result to a result buffer for the corresponding frequency band.

According to a third embodiment of this second aspect of the invention, the storage media further has instructions stored thereon that, when executed by the one or more processors, cause the one or more processors to perform in said step of performing resonance analysis on a buffer at least the steps of

- performing a fast fourier transform on a plurality of latest blocks of said buffer, converting the resulting complex response into a real response, overpass filtering of said real response to retain only peaks of said real response, forming a resonance response based on said filtered real response, and forming said filter response based on the resonance response.

According to a third aspect of the invention, a computer-readable storage media is provided. According to a first embodiment of this third aspect of the invention the storage media has instructions stored thereon that, when executed by a processor, cause the processor to perform at least the steps of receiving a first block of new sound samples, filtering said first block into at least two sub-band signals representing different frequency bands of the audio content in said first block, and performing at least the following steps S1 to S7 for at least one of said at least two sub-band signals:

S1) sub-sampling said sub-band signal,

S2) adding the sub-sampled signal to a first buffer for the corresponding frequency band, S3) performing a resonance analysis step for the first buffer for the corresponding frequency band, thereby producing a filter response for the corresponding frequency band, S4) convolving the sub-sampled signal or the first complete block of the first buffer with the filter response for the corresponding frequency band, S5) adding the convolution result to a second buffer for the corresponding frequency band, S6) upsampling the first complete block of said second buffer for the corresponding frequency band, and S7) adding the upsampled result to a result buffer for the corresponding frequency band; and summing the first complete blocks of said result buffers for each frequency band to form an output block.

According to a second embodiment of this third aspect of the invention, the storage media further has instructions stored thereon that, when executed by a processor, cause the processor to perform a at least the following steps for at least one of said at least two sub-band:

adding the sub-band signal to a first buffer for the corresponding frequency band, performing a resonance analysis step for the first buffer for the corresponding frequency band, thereby producing a filter response for the corresponding frequency band, convolving the sub-band signal or the first complete block of the first buffer with the filter response for the corresponding frequency band, and adding the convolution result to a result buffer for the corresponding frequency band.

According to a third embodiment of this third aspect of the invention, the storage media further has instructions stored thereon that, when executed by a processor, cause the processor to perform in said step of performing resonance analysis on a buffer at least the steps of performing a fast fourier transform on a plurality of latest blocks of said buffer, converting the resulting complex response into a real response, overpass filtering of said real response to retain only peaks of said real response, forming a resonance response based on said filtered real response, and forming said filter response based on the resonance response.

In view of the foregoing description it will be evident to a person skilled in the art that various modifications may be made within the scope of the invention. While a preferred embodiment of the invention has been described in detail, it should be apparent that many modifications and variations thereto are possible, all of which fall within the true spirit and scope of the invention.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to “one embodiment” or “an embodiment” means that a particular feature, structure, or characteristic described in connection with the embodiment is included in at least one embodiment of the present invention. Thus, appearances of the phrases “in one embodiment” or “in an embodiment” in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the previous description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for processing resonances in a digital sound signal, the method comprising the steps of:

receiving a first block of new sound samples of the digital sound signal, filtering the first block of the digital sound signal into at least two sub-band audio signals representing different frequency bands of the audio content in said first block of the digital sound signal, and performing at least the following steps S1 to S7 for at least a first sub-band signal of said at least two sub-band audio signals:

S1) sub-sampling the sub-band audio signal,

S2) adding the sub-sampled signal to a first buffer for the corresponding frequency band, S3) performing a resonance analysis step for the first buffer for the corresponding frequency band, thereby producing a filter response for the corresponding frequency band, S4) convolving the sub-sampled signal or a first complete block of the first buffer with the filter response for the corresponding frequency band, S5) adding the convolution result to a second buffer for the corresponding frequency band, S6) upsampling a first complete block of said second buffer for the corresponding frequency band, and S7) adding the upsampled result to a result buffer for the corresponding frequency band; and summing first complete blocks of said result buffers for each frequency band to form an output block of an output digital sound signal.

2. The method according to claim 1, wherein at least the following steps are performed for at least a second sub-band signal of said at least two sub-band signals:

adding the sub-band signal to a first buffer for the corresponding frequency band, performing a resonance analysis step for the first buffer for the corresponding frequency band, thereby producing a filter response for the corresponding frequency band, convolving the sub-band signal or the first complete block of the first buffer with the filter response for the corresponding frequency band, and adding the convolution result to a result buffer for the corresponding frequency band.

3. The method according to claim 1, wherein the step of performing resonance analysis on a buffer further comprises the steps of:

performing a fast Fourier transform on a plurality of latest blocks of the buffer, converting the resulting complex response into a real response, overpass filtering the real response to retain only peaks of said real response, forming a resonance response based on said filtered real response, and forming the filter response based on the resonance response.

4. The method according to claim 3, further comprising the step of windowing the data in the buffer before the step of performing a fast Fourier transform.

5. The method according to claim 3, further comprising the step of clipping the filtered real response after the step of overpass filtering to remove any signal in said filtered real response that is lower than a predetermined threshold.

6. A sound processing device for processing resonances in a digital sound signal, comprising:

one or more processors; and one or more computer-readable storage media comprising instructions stored thereon that, when executed by the one or more processors, cause the one or more processors to perform the steps of:

receiving a first block of new sound samples of the digital sound signal, filtering the first block of the digital sound signal into at least two sub-band audio signals representing different frequency bands of the audio content in said first block of the digital sound signal, and performing at least the following steps S1 to S7 for at least a first sub-band signal of said at least two sub-band audio signals:

S1) sub-sampling the sub-band signal,

S2) adding the sub-sampled signal to a first buffer for the corresponding frequency band, S3) performing a resonance analysis step for the first buffer for the corresponding frequency band, thereby producing a filter response for the corresponding frequency band, S4) convolving the sub-sampled signal or a first complete block of the first buffer with the filter response for the corresponding frequency band, S5) adding the convolution result to a second buffer for the corresponding frequency band, S6) upsampling a first complete block of said second buffer for the corresponding frequency band, and S7) adding the upsampled result to a result buffer for the corresponding frequency band; and summing first complete blocks of the result buffers for each frequency band to form an output block of an output digital sound signal.

7. The sound processing device according to claim 6, wherein the storage media further comprises instructions stored thereon that, when executed by the one or more processors, causes the one or more processors to perform the following steps for at least a second sub-band signal of the at least two sub-band signals:

adding the sub-band signal to a first buffer for the corresponding frequency band, performing a resonance analysis step for the first buffer for the corresponding frequency band, thereby producing a filter response for the corresponding frequency band, convolving the sub-band signal or the first complete block of the first buffer with the filter response for the corresponding frequency band, and adding the convolution result to a result buffer for the corresponding frequency band.

8. The sound processing device according to claim 6, wherein storage media further comprises instructions stored thereon that, when executed by the one or more processors, cause the one or more processors to perform in the step of performing resonance analysis on a buffer the steps of:

performing a fast fourier transform on a plurality of latest blocks of said buffer, converting the resulting complex response into a real response, overpass filtering the real response to retain only peaks of said real response, forming a resonance response based on said filtered real response, and forming the filter response based on the resonance response.

9. A non-transitory computer-readable storage media comprising instructions stored thereon that, when executed by a processor, cause the processor to perform the steps of:

receiving a first block of new sound samples of an output digital sound signal, filtering the first block of an output digital sound signal into at least two sub-band audio signals representing different frequency bands of the audio content in said first block of an output digital sound signal, and performing at least the following steps S1 to S7 for at least a first sub-band audio signal of the at least two sub-band audio signals:

S1) sub-sampling the sub-band audio signal,

S2) adding the sub-sampled signal to a first buffer for the corresponding frequency band, S3) performing a resonance analysis step for the first buffer for the corresponding frequency band, thereby producing a filter response for the corresponding frequency band, S4) convolving the sub-sampled signal or a first complete block of the first buffer with the filter response for the corresponding frequency band, S5) adding the convolution result to a second buffer for the corresponding frequency band, S6) upsampling a first complete block of said second buffer for the corresponding frequency band, and S7) adding the upsampled result to a result buffer for the corresponding frequency band; and summing first complete blocks of said result buffers for each frequency band to form an output block of an output digital sound signal.

10. The computer-readable storage media according to claim 9, wherein the storage media further comprises instructions stored thereon that, when executed by a processor, cause the processor to perform the following steps for at least a second sub-band signal of said at least two sub-band signals:

adding the sub-band signal to a first buffer for the corresponding frequency band, performing a resonance analysis step for the first buffer for the corresponding frequency band, thereby producing a filter response for the corresponding frequency band, convolving the sub-band signal or the first complete block of the first buffer with the filter response for the corresponding frequency band, and adding the convolution result to a result buffer for the corresponding frequency band.

11. The computer-readable storage media according to claim 9, wherein the storage media further comprises instructions stored thereon that, when executed by a processor, cause the processor to perform in said step of performing resonance analysis on a buffer at least the steps of:

performing a fast Fourier transform on a plurality of latest blocks of said buffer, converting the resulting complex response into a real response, overpass filtering of the real response to retain only peaks of said real response, forming a resonance response based on said filtered real response, and forming the filter response based on the resonance response.

* * * * *